United States Patent [19]

Hayakawa

[11] Patent Number: 4,484,654
[45] Date of Patent: Nov. 27, 1984

[54] TORQUE TRANSFER MECHANISM FOR A FOUR-WHEEL DRIVE VEHICLE

[75] Inventor: Yoichi Hayakawa, Toyoake, Japan

[73] Assignee: Aisin Warner Kabushiki Kaisha, Toyoake, Japan

[21] Appl. No.: 425,766

[22] Filed: Sep. 28, 1982

[30] Foreign Application Priority Data

Jun. 8, 1980 [JP] Japan .................... 55-107927

[51] Int. Cl.³ .............................................. B60K 17/34
[52] U.S. Cl. .................................. 180/247; 180/248; 74/867
[58] Field of Search ............... 180/247, 248, 249, 250, 180/233; 74/867

[56] References Cited

U.S. PATENT DOCUMENTS

| | | | |
|---|---|---|---|
| 4,185,723 | 1/1980 | Kelbel | 180/247 X |
| 4,298,085 | 11/1981 | Moroto et al. | 180/247 |
| 4,369,671 | 1/1983 | Matsumoto | 180/247 X |

Primary Examiner—John A. Pekar
Attorney, Agent, or Firm—Blum, Kaplan, Friedman, Silberman & Beran

[57] ABSTRACT

A torque transfer mechanism includes the output shaft of a power source to be connected to the rear axle, a first intermediate output shaft disposed concentrically with said output shaft, a second intermediate output shaft to be connected to the front axle, a power transmitting means for drivingly connecting said first and second intermediate output shafts, and a frictional coupling means interposed between said output shaft and said first intermediate output shaft. Said frictional coupling means comprises frictional members, a first cylinder, a first piston received in said first cylinder and adapted to apply a pressure to said frictional members, a second cylinder formed in said first piston, and a second piston received in said second cylinder. When the pressurized fluid is supplied only to said second cylinder, a slip between said output shaft and said first intermediate output shaft is allowed during the running of the vehicle along a curve to allow easy running operation of the vehicle.

9 Claims, 6 Drawing Figures

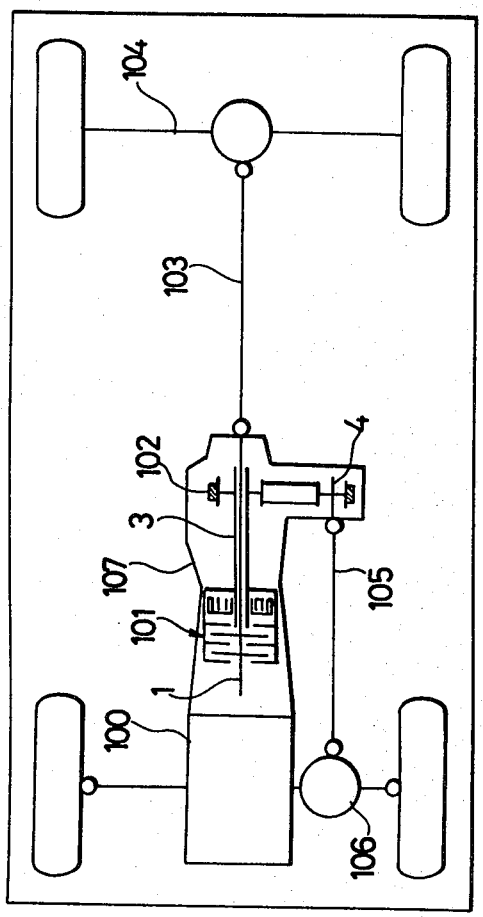
F I G. 1

TORQUE TRANSFER MECHANISM FOR A FOUR-WHEEL DRIVE VEHICLE

BACKGROUND OF THE INVENTION

This invention relates to a transfer mechanism capable of simultaneous transmission of a driving force to the front and the rear axles of a vehicle from a single power source including a prime mover and a transmission.

A typical transfer mechanism of this type is connected to the output shaft of the transmission of the power source and is adapted to distribute power to the front axle and the rear axle of the vehicle through the output shafts thereof. While a four-wheel drive vehicle equipped with such a transfer mechanism is running straight ahead, the output shafts of the transfer mechanism for distributing driving force to the front and the rear axles are connected with each other through power transmitting means, such as gears, chains or belts, at a predetermined ratio of revolving rates. When this vehicle is turned by controlling the steering wheels, usually, the front wheels (the front wheels are considered to serve as steering wheels, hereinafter, in this specification), differential rotation between the respective output shafts of the transfer mechanism for driving the front axle and the rear axle is required, since the turning radius of the front wheels is greater than that of the rear vehicle.

Accordingly, a conventional transfer mechanism of this type comprises a differential gear mechanism in the transfer gear unit, whereby either the output shaft for the front axle or the output shaft for the rear axle is directly connected to the output shaft of the transmission while the other output shaft of the transfer mechanism is connected to the aforementioned output shaft through a differential gear mechanism. A vehicle equipped with such a driving mechanism is liable to fail running when one of the wheels fails to keep the traction resulting from bad contact with the ground during four-wheel drive running, since differential gear mechanisms are mounted on the front axle and the rear axle, respectively. In order to avoid such running inability of the vehicle, a viscous control coupling is formed in the differential mechanism of the transfer gear unit between the two output shafts thereof or a so-called limited slip differential mechanism is employed so that at least some finite torque can be transmitted to the four wheels.

However, it is usual to provide in the transfer gear unit an additional mechanism capable of locking the driving train connected to the front and the rear axles to attain nonslip rotation, since there still remains the possibility of slipping in case of insufficient torque transfer capacity of the mechanism even when the viscous control coupling or the nonslip differential mechanism is employed. Although the safety of and the durability of the transfer mechanism are increased and the riding comfortableness of the vehicle is improved through the provision of the differential mechanism, viscous control coupling or the limited slip mechanism, and the locking mechanism, the cost of the vehicle increases.

What is needed is a torque transfer mechanism for a four-wheel drive vehicle of simplified construction and maintaining effective four-wheel drive in all running states.

SUMMARY OF THE INVENTION

Generally speaking, in accordance with the present invention, a torque transfer mechanism especially suitable for a four-wheel drive vehicle is provided.

the transfer mechanism is mounted on a vehicle together with a power source including a prime mover and an automatic transmisstion. The output shaft of the power source is always connected either with an output shaft for the front axle or with an output shaft for the rear axle of the vehicle. The transfer mechanism includes a first intermediate output shaft connected to the output shaft of the power source through a friction coupling means and a second intermediate shaft connected to the other one of the output shafts for the front and rear axles and a power transmitting means connecting the first and the second intermediate output shafts. The friction coupling means has a first coupling member and a second coupling member provided on the output shaft of the power source and the first intermediate output shaft, respectively, a first cylinder formed in one of said coupling members, a first piston slidably received in the first piston, and a frictional member interposed between the first coupling member and the second coupling member for frictionally engaging or releasing those coupling members corresponding to the operation of the first piston. The transfer mechanism connects the output shaft of the power source and either the front axle or the rear axle for two-wheel drive running while a pressurized fluid is not supplied to the first and second cylinders.

The transfer mechanism connects the ouptut shaft of the power source and either the front axle or the rear axle for two-wheel drive running while a pressurized fluid is not supplied to the first and second cylinders. The transfer mechanism connects the output shaft of the power source to both the front axle and the rear axle for four-wheel drive running when the pressurized fluid is supplied only the second cylinder of the frictional coupling means and is adapted to allow a slip between the frictional members when a large difference between the revolving rate of the front axle and that of the rear axle is caused so that a temporary differential motion between the front and the rear axles is allowed. The transfer mechanism is adapted to connect the output shaft of the power source both to the front axle and to the rear axle and to maintain the ratio between the revolving rate of the front axle and that of the rear axle at a predetermined level so that the temporary differential motion between the front and rear axles is not allowed, while the pressurized fluid is supplied to the first cylinder or both to the first cylinder and to the second cylinder of the frictional coupling means.

The transfer mechanism in accordance with the present invention may include an intermediate shaft coaxially disposed between the output shaft of the power source and the first intermediate shaft. A reduction gear comprising a planetary gear mechanism is suitable to the auxilary transmission. The reduction gear includes a sun gear fixed to the output shaft of the power source, a planetary carrier connected to the intermediate shaft, and a ring gear. The ring gear is adapted to be fastened to or released from a fixed part of the casing of the transfer mechanism by means of a brake, while the sun gear and the planetary carrier can be engaged or disengaged by means of a clutch.

More particularly, the transfer mechanism includes the output shaft of the power source of a vehicle, a first intermediate output shaft connected to the output shaft through a frictional coupling means, and a second intermediate output shaft connected to the first intermediate output shaft by means of a power transmitting means. The frictional coupling means comprises a first coupling member provided with a frictional member and connected either to the output shaft or to the first intermediate output shaft, a second coupling member connected to the other one of the output shaft or the first intermediate output shaft, disposed concentrically with the first coupling member, provided with a frictional member and forming a first cylinder, a first piston slidably received in the first cylinder and movable axially of the second coupling member and adapted to cause the frictional member to frictionally engage when pressurized fluid is supplied into the cylindrical chamber of the first cylinder, and a second piston axially slidably received in a second cylinder formed in the first piston and opening on the side facing the cylindrical chamber thereof and adapted to cause the first piston to slide for making the frictional member frictionally engage when the pressurized fluid is supplied into the cylindrical chamber of the second cylinder.

Accordingly, it is an object of this invention to provide an improved torque transfer mechanism for a four-wheel drive vehicle having a simplified construction which is capable of maintaining the driving force of the driving trains connected to the front and the rear axles in any running state.

A further object of this invention is to provide an improved torque transfer mechanism capable of causing differential motion between the driving train for the front axle and the driving train for the rear axle without using a differential gear mechanism and of causing direct coupling between the driving train for the front axle and the driving train for the rear axle by checking the differential motion between the driving trains by connecting the driving trains by means of a frictional coupling means.

A still further object of this invention is to provide an improved torque transfer mechanism which is shiftable between differential motion and direct coupling between the driving train for the front axle and driving train for the rear axle by means of a simplified construction.

Still other objects and advantages of the invention will in part be obvious and will in part be apparent from the specification.

The invention accordinly, comprises the features of construction, combinations of elements, and arrangement of parts which will be exemplified in the construction hereinafter set forth, and the scope of the invention will be indicated in the claims.

BRIEF DESCRIPTION OF THE DRAWINGS

For further understanding of the invention, reference is has to the following descriptions taken in connection with the accompanying drawings, in which:

FIG. 1 is a general view of an embodiment of a transfer mechanism in accordance with the invention.

DESCRIPTION OF THE PREFERRED EMBODIMENTS

Figure 2:
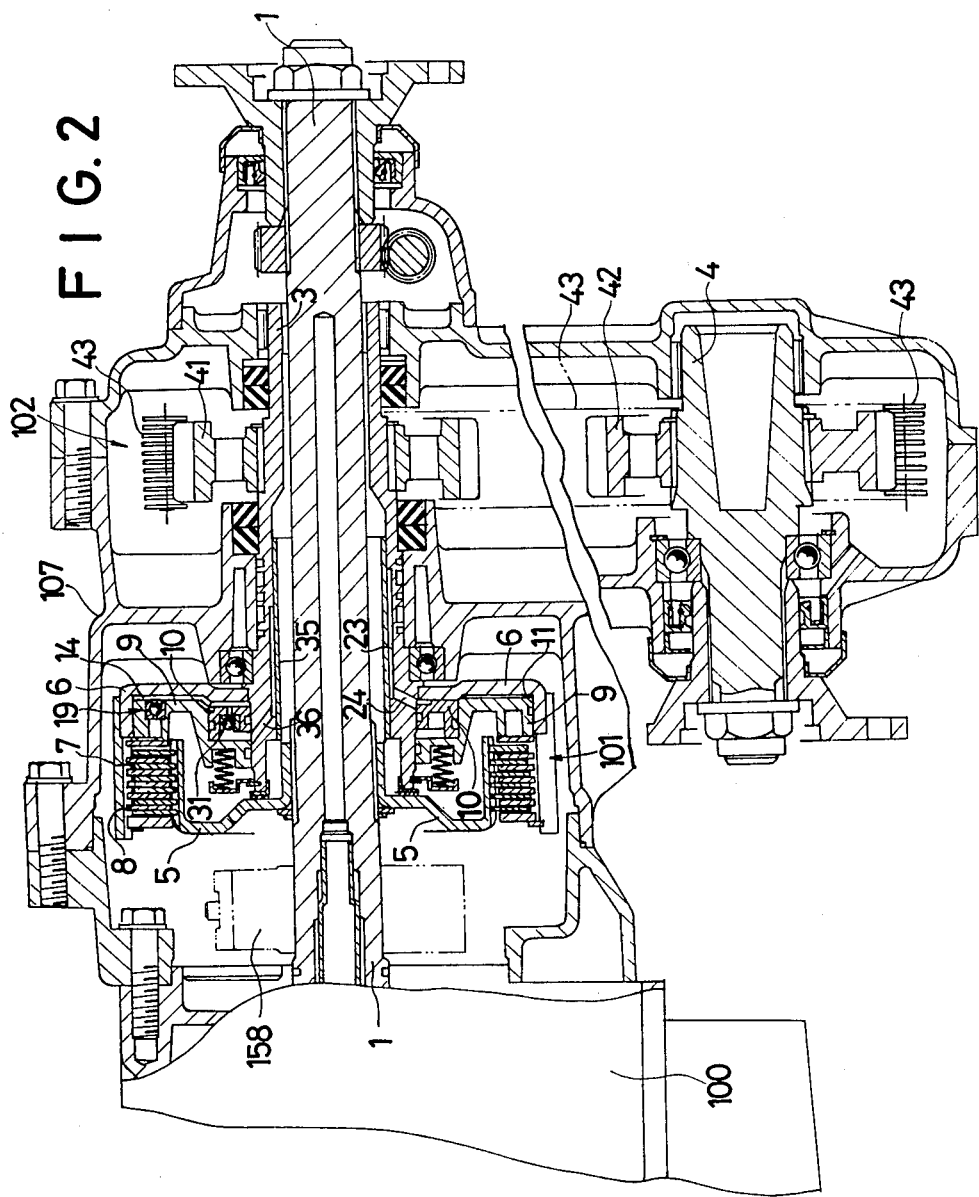
FIG. 2 is a sectional view of the transfer mechanism of FIG. 1.

Referring to FIG. 1, there are shown a power source 100 including an internal combustion engine and an automatic transmission having a torque converter, a transmission gear mechanism and a hydraulic control system for the automatic transmission, a frictional coupling means 101, a power transmitting means 102, an output shaft 103 for transmitting power to a rear axle 104, an output shaft 105 for transmitting power to a front axle 106 and a casing 107 of the transfer mechanism. Driving force is transmitted to the rear axle 104 through the output shaft 1 of the power source 100 and the output shaft 103, while driving force is transmitted to the front axle 106 through a first intermediate output shaft 3 connected to the output shaft 1 by means of the frictional coupling means 101, the power transmitting means 102, a second intermediate output shaft 4 and the output shaft 105.

Referring to FIG. 2 illustrating, in section, the detailed construction of the embodiment of the transfer mechanism of FIG. 1, the output shaft 1 rotatably supported by the casing 107 is fitted coaxially through the first intermediate output shaft 3 for relative rotation between the output shaft 1 and the first intermediate output shaft 3. The frictional coupling means 101 comprises a first coupling member 5 fixed to the output shaft 1 by means of splines and snap ring, a second coupling member 6 fixed to the first intermediate output shaft 3, frictional members 7 and 8 retained by the coupling members 5 and 6 respectively, a first piston 9 received in the second coupling member 6, and a second piston 10 received in the first piston 9. The first piston 9 causes the frictional members 7 and 8 to engage frictionally with each other for connecting the output shaft 1 and the first intermediate output shaft 3 when a pressurized fluid is supplied into a first cylinder 11.

Figure 3:
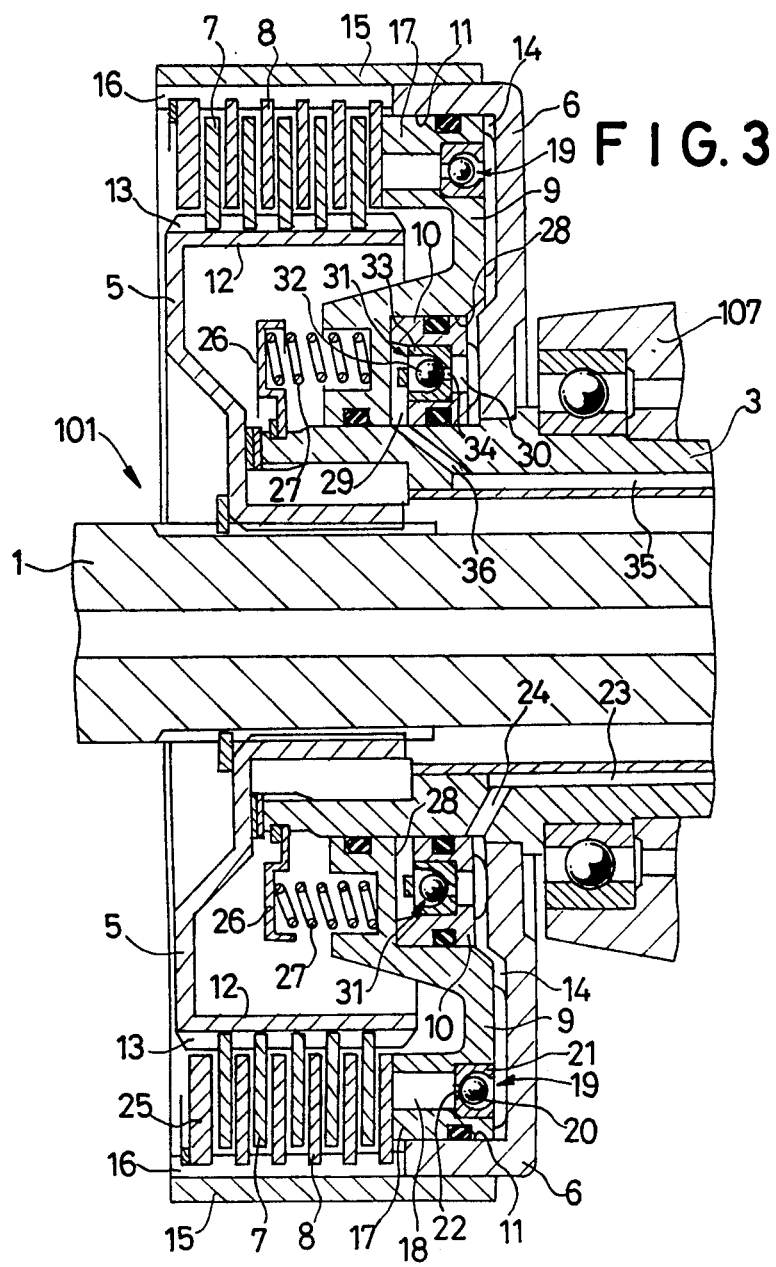
FIG. 3 is an enlarged view of a portion of the transfer mechanism of FIG. 2.

FIG. 3 is an enlarged sectional view illustrating the detailed construction of the frictional coupling means 101, in which a cylindrical wall 12 is formed concentrically with the output shaft 1 around the rim of the first coupling member 5. The internally splined annular frictional members 7 are slidably engaged with splines 13 formed axially in the outer surface of the cylindrical wall 12. The cylinder 11 is formed in the second coupling member 6 on the side thereof facing the first coupling member 5. The piston 9 is fitted in the cylinder 11 and is slidable axially of the first intermediate output shaft 3. A tubular member 15 provided with internal splines 16 is fixed to the coupling member 6 along the periphery thereof concentrically with the intermediate output shaft 3 and opposite to the cylindrical wall 12. The externally splined frictional members 8 are slidably engaged with the internal splines 16 formed in the tubular member 15.

An axially protruding annular wall 17 is formed along the periphery of the first piston 9. Axial through holes 18 are formed in the annular wall 17 at suitable positions. A relief valve 19 is provided for each through hole 18 at the portion thereof opening into the cylindrical chamber 14 of the cylindrer 11. A ball valve element 20 is seated on the valve seat formed in a valve casing 21 so as to close an orifice 22 formed in the valve casing 21 when the pressurized fluid is supplied into the cylindrical chamber 14. Accordingly, when the pressurized fluid is supplied into the cylindrical chamber 14 through passages 23, 24 drilled or engraved in the first intermediate output shaft 3, the first piston 9 is caused to slide within the cylinder wall 11 and to press the frictional members 7, 8 between the annular wall 17 of the piston 9 and a pressure member 25 retained by the tubular member 15 so that the frictional members 7, 8 are frictionally engaged with each other, whereby the first coupling member 5 and the second coupling member 6 are connected.

When the cylindrical chamber 14 is drained, the first piston 9 is returned to its original position by the resilient force of a spring 27 which is compressed between the piston 9 and a holding member 26 fixed to the first intermediate output shaft 3 at one end thereof. When the pressure within the cylindrical chamber 14 is cancelled, the ball valve element 20 is moved by a centrifugal force generated by the rotation of the first intermediate output shaft 3 off the valve seat and is allowed to roll within a loose space formed in the valve casing 21 so the the orifice 22 is opened, consequently the fluid remaining within the cylindrical chamber 14 is discharged outside through the orifice 22 and through the hole 18.

A second cylinder 28 opening into the cylindrical chamber 14 of the first cylinder 11 is formed in the first piston 9 in the axially central part thereof. A second piston 10 is fitted in the cylinder 28 so as to be slidable axially of the first intermediate output shaft 3. Through holes 30 allowing the cylindrical chamber 29 of the second cylinder 28 to communicate with the first cylindrical chamber 14 are drilled in the second piston 10 at appropriate positions. A relief valve 31 is provided in each through hole 30 at the opening portion thereof opening into the cylindrical chamber 29.

A ball valve element 32 closes an orifice 34 formed in a valve casing 32 when the pressurized fluid is supplied into the cylindrical chamber 29 so that the second piston is caused to slide toward the second coupling member 6. A reaction force resulting from the movement of the second piston 10 causes the first piston 9 to move so that the frictional members 7, 8 are engaged with each other. The construction and the effect of action of the relief valves 31 are substantially similar to those of the relief valves 19. The pressurized fluid is supplied into the cylindrical chamber 29 of the second cylinder 28 through passages 35, 36 drilled or engraved in the first intermediate output shaft 3.

The magnitude of the force which causes the coupling members 5, 6 to be connected is smaller when the pressurized fluid is supplied into the cylindrical chamber 29 through the passages 35, 36 than when the pressurized fluid is supplied into the cylindrical chamber 14 through the passages 23, 24. When the pressurized fluid is supplied both to the cylindrical chamber 29 and to the cylindrical chamber 14, the force for causing the coupling members 5, 6 to be connected is increased as compared with the force generated when the pressurized fluid is supplied only into the cylindrical chamber 14.

Referring again to FIG. 2, the power transmitting means for transmitting a driving force from the first intermediate output shaft 3 to the second intermediate output shaft 4 consists of sprocket wheels 41, 42 fixed concentrically to the first intermediate output shaft 3 and the second intermediate output shaft 4 which is disposed in parallel to the first intermediate output shaft 3, respectively, and a chain belt 43 extending between the sprocket wheels 41, 42.

In FIG. 2, a goventor valve is indicated at 158.

In the embodiment described above, when the pressurized fluid is supplied into the cylindrical chamber 14 of the cylinder 11 and the cylindrical chamber 29 through the passages 23, 24 and the passages 35, 36, respectively, the fluid pressure works on the total area of the first piston 9, therefore, a greater frictional force is generated between the frictional members 7, 8, whereas the frictional force generated between the frictional members 7, 8 through the movement of the first piston 9 is smaller as compared with the former when the pressurized fluid is supplied only into the cylindrical chamber 29 of the second cylinder 28, since the fluid pressure works only on the area of the second piston 10.

When the vehicle runs along a curve, the turning radius of the front wheel is greater than that of the rear wheel. Consequently, the torque generated within the driving train for distributing driving force to the front wheel and the rear wheel, while locking the output shaft 103 and the output shaft 105 in the four-wheel drive mode, becomes greater than a torque necessary for running (this phenomenon is called "wind-up" or "torsion" of the driving train), and in some cases, the torque generated within the driving train in the four-wheel drive mode becomes greater than twice the torque necessary for running.

Accordingly, the pressure-receiving area of the second piston 10 and the fluid pressure are so selectively determined that the torque transmitting capacity of the frictional engagement between the frictional members 7, 8 by means of the force generated by operation of the second piston 10 is somewhat greater than the output torque capacity of the prime mover of the power source 100, so that when the vehicle is driven in the four-wheel drive mode with the pressurized fluid supplied into the cylindrical chamber 29 of the second cylinder 28 and without the pressurized fluid supplied into the cylindrical chamber 14 of the first cylinder 11, the frictional engagement between the frictional members 7, 8 is not caused to slip during straight running of the vehicle and the front and the rear wheels are driven at the same revolving rate, whereas the frictional engagement between the frictional members 7, 8 is caused to slip when the vehicle runs along a curve and a torque greater than the torque necessary for running is generated within the driving train for distributing driving force to the front axle 106 and to the rear axle 104, whereby a differential motion is caused between the output shaft 1 and the first intermediate output shaft 3 and irregular running of the vehicle and undesirable effects on the durability of the power transmitting means 102 are prevented. Furthermore, the torque of the prime mover is transmitted to the four wheels even during the differential motion between the output shaft 1 and the first intermediate output shaft 3 as described above, while only the excessive torque is absorbed by slip between the frictional members. Thus, the drive train is not subjected to torsion.

When the output shafts 103, 105 connected to the front and the rear axles 104, 106, respectively, are required to be locked while the vehicle is running, the pressurized fluid is applied into the cylindrical chamber 14 of the first cylinder 11 as well as into the cylindrical chamber 29 of the second cylinder 28 so that a friction force of engagement between the frictional members, which is proportional to the pressure-receiving area of the first piston 9, is generated. The torque transmitting capacity of the frictional coupling means 101 is determined at a greater level than the maximum torque required by the driving train for distributing driving force to the front and rear axles when the friction force proportional to the pressure-receiving area of the first piston 9 is applied thereto, the output shafts 103, 105 can be locked mutually under any driving condition.

Selective employment of either the first piston 9 or the second piston 10 in causing the frictional members to engage frictionally can be attained by means of a simple device capable of controlling the distribution of the pressurized fluid into the corresponding cylindrical chambers 14, 29, and where the power source 100 includes an automatic transmission, the line pressure of the hydraulic control circuit of the automatic transmission is applicable to controlling the pressurized fluid distribution to the cylindrical chamber 14, 29.

Figure 4:
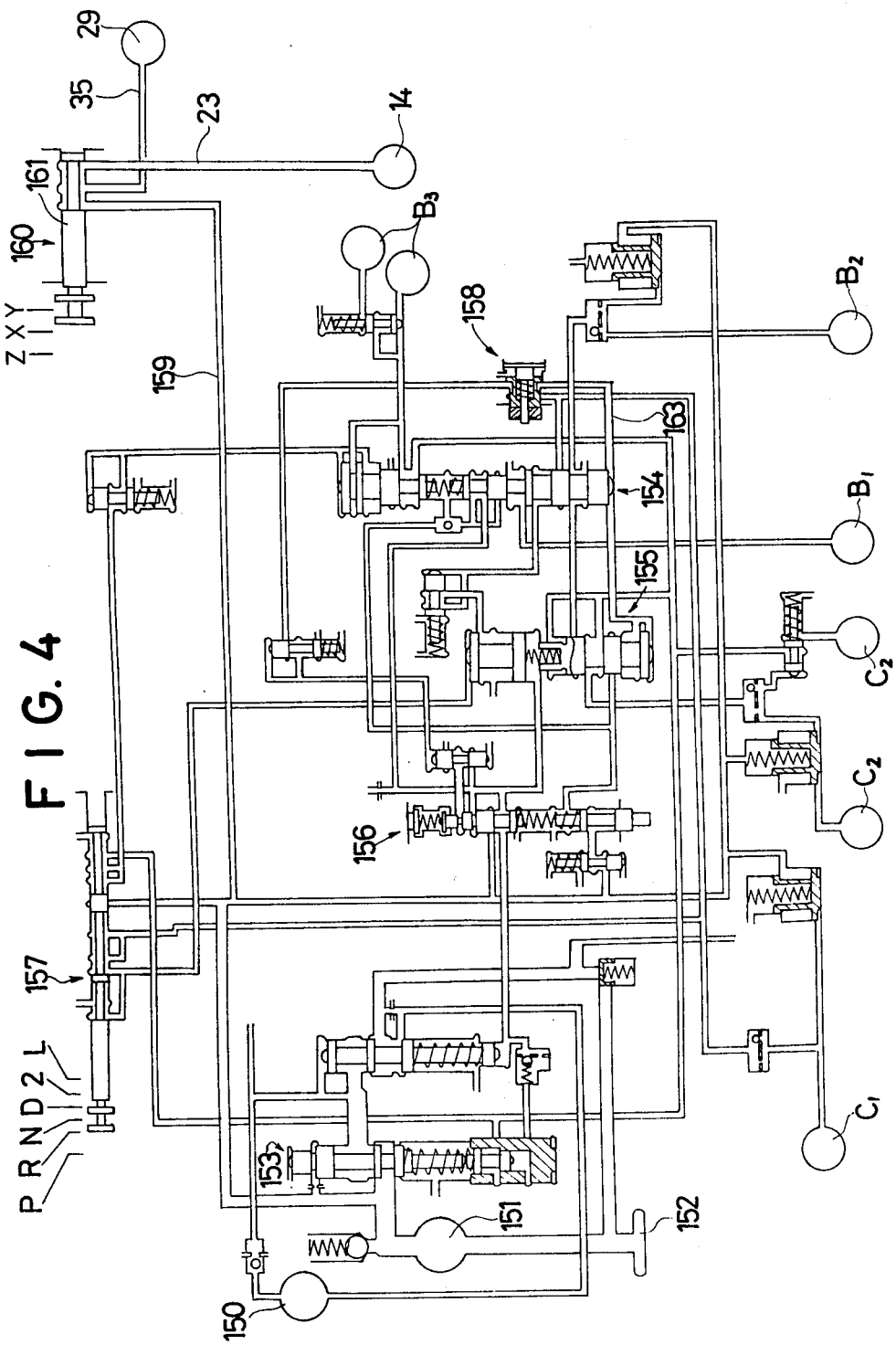
FIG. 4 is a schematic illustration of a hydraulic circuit for controlling the transfer mechanism in accordance with the invention.

FIG. 4 shows an exemplary hydraulic control system for an automatic transmission of three forward speeds and one reverse speed. The hydraulic control system comprises a torque converter 150, a pump 151, a reservoir 152, a hydraulic control valve 153, a 1-2 shift valve 154, a 2-3 shift valve 155, a throttle valve 156, a manual valve 157 and a governor valve 158. In employing the hydraulic control circuit for controlling the mechanism of the present invention, it is only to connect a selector valve 160 to the passage 159 of the hydraulic control system and to arrange passages so as to apply the line pressure to the cylinder 28 when the spool 161 of the selector valve 160 is positioned to X-position, while to apply the line pressure to the cylindrical chamber 14 of the first cylinder 11 and the cylinder chamber 29 of the second cylinder 28 when the spool 161 is positioned at Y-position. With the spool 161 positioned at Z-position, the pressurized fluid is not supplied to the frictional coupling means 101, hence the cylindrical chamber 14 of the first cylinder 11 as well as the cylindrical chamber 29 of the second cylinder 28 are drained, the frictional coupling means 101 disengages the output shaft 1 of the power source 100 and the first intermediate output shaft 3. Consequently, the driving force of the power source 100 is transmitted only to the rear axle 104 through the output shaft 103, whereas the driving force is not transmitted to the output shaft 105, so that the drive train is changed to a two-wheel drive mode.

Figure 5:
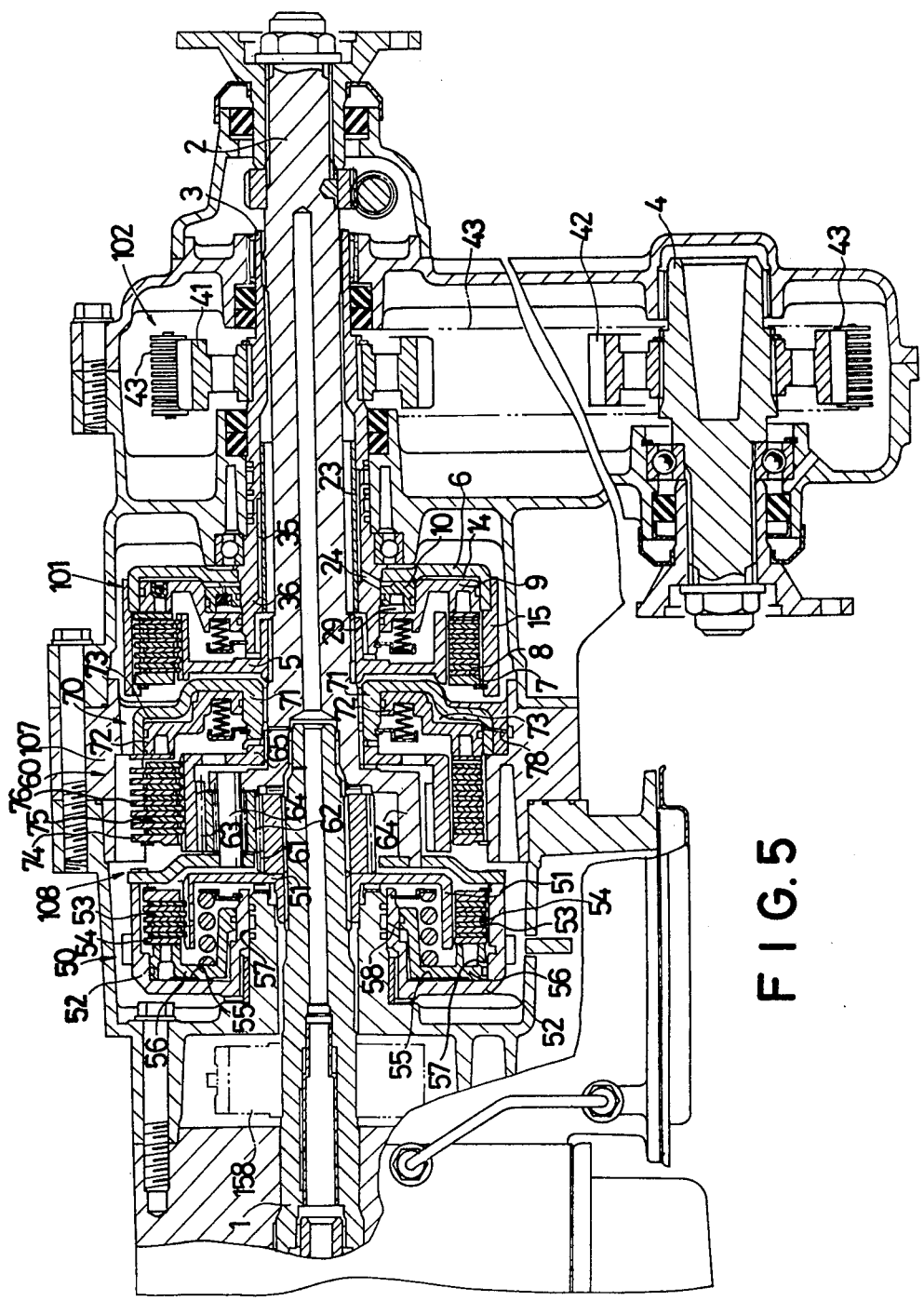
FIG. 5 is a sectional view of an alternative embodiment of a transfer mechanism in accordance with the invention.
Figure 6:
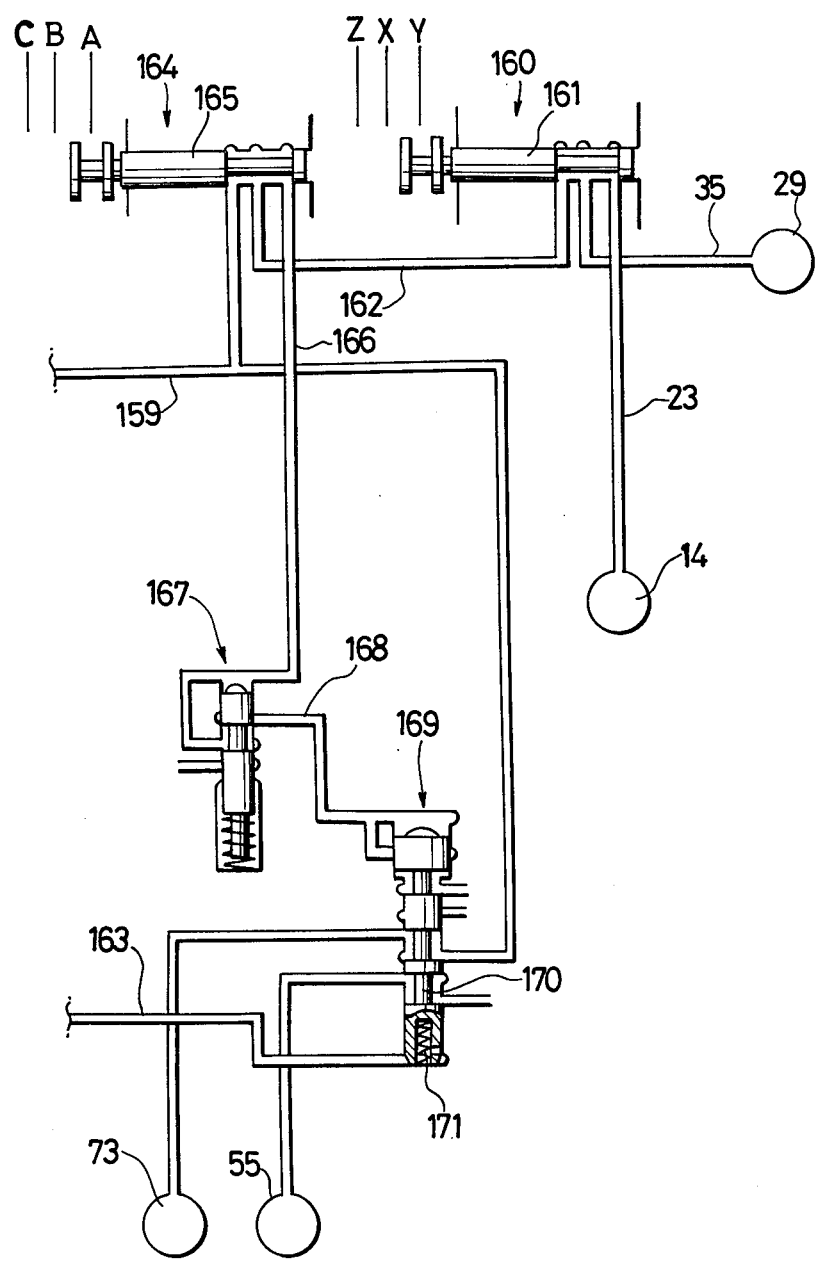
FIG. 6 is a schematic illustration of a portion of a hydraulic circuit for controlling the transfer mechanism of FIG. 5.

FIGS. 5 and 6 show another embodiment of the present invention. Referring to FIG. 5, this embodiment is different from the firsdt embodiment shown in FIG. 2 with regard to rotatably supporting an intermediate shaft 2 on a casing 107 coaxially with an output shaft 1, interposing, between the output shaft 1 and the intermediate shaft 2, an auxilary transmission 108 capable of converting the revolving rate of the output shaft 1 and then transmitting the converted revolving rate to the intermediate shaft 2 and of rotatably supporting a first intermediate output shaft 3 on the intermediate shaft 2, whereas the construction of the frictional coupling means 101 and the power transmitting means 102 are similar to that of those means of the embodiment of FIG. 2, respectively. Accordingly, like reference numerals designate like or corresponding parts or units throughout.

The auxiliary transmission 108 comprises a hydraulic clutch 50, a plantetary gear mechanism 60 and a hydraulic brake 70. A first coupling element 51 of the hydraulic clutch 50 is fixed to the output shaft 1, while a second coupling element 52 thereof is fixed to a carrier 64 rotatably supporting planetary pinions 62 of the planetary gear mechanism 60. Frictional members 53, 54 supported on the first and the second coupling elements 51, 52, respectively, are adapted to be engaged or disengaged by means of a piston 56 fitted in a cylinder 57 formed in the second coupling element 52. A sun gear 61 of the planetary gear mechanism 60 is coaxially fixed to the output shaft 1.

When a pressurized fluid is supplied into the cylindrical chamber 55 of the cylinder 57 of the hydraulic clutch 50, the first coupling element 51 and the second coupling element 52 are engaged through the frictional engagement of the frictional members 53, 54, so that the carrier 64 of the planetary gear mechanism 60 is locked with respect to the sun gear 61.

The carrier 64 of the planetary gear mechanism 60 is connected to the intermediate shaft 2. A ring gear 63 of the planetary gear mechanism 60 is concentrically and rotatably supported on the intermediate shaft 2 at the flange 65 thereof. Internally splined frictional members 75 splined on the ring gear 63 and externally splined frictional members 76 splined on the casing 107 of the transfer mechanism are disposed alternately. A cylinder 71 of the hydraulic brake 70 is formed integrally in the casing 107. When the pressurized fluid is supplied into the cylindrical chamber 73 of the cylinder 71, a piston 72 fitted in the cylindrical chamber 73 is moved to press the frictional members 75, 76 between the piston 72 and a pressure plate 74, so that the ring gear 63 is fixedly restrained by the casing 107.

In accordance with the construction as described above, the hydraulic clutch 50 is engaged when the pressurized fluid is supplied into the cylindrical chamber 55 of the hydraulic clutch 50. Then the output shaft 1 and the intermediate shaft 2 are fixedly coupled, so that the driving force is distributed to the rear axle 104 in a manner as described hereinbefore with reference to FIG. 2. While the pressurized fluid is not supplied into the cylindrical chamber 55, the hydraulic clutch 50 is not engaged.

Therefore, the carrier 64 of the planetary gear mechanism 60 rotates together with the intermediate shaft 2. The pressurized fluid is supplied into the cylindrical chamber 73 of the hydraulic brake 70 in this state, and the ring gear 63 of the planetary gear mechanism 60 is locked. Therefore, the driving force of the output shaft 1 is transmitted from the sun gear of the planetary mechanism 60 to the planetary pinion 62 to drive the intermediate shaft 2 at a reduced revolving rate through the carrier 64. Thus, in this state, with the same involving rate of the prime mover of the power source 100, a driving force of a reduced revolving rate and a higher torque is transmitted to the intermediate shaft 2 as compared with the driving force provided in the state in which the hydraulic clutch 50 is engaged. Therefore, this state is suitable to four-wheel drive running on irregular ground, in which a greater torque is required. In FIG. 5, reference numerals 58, 78 designate passages for supplying pressurized fluid into the cylindrical chamber 55 of the hydraulic clutch 50 and the cylindrical chamber 73 of the hydraulci brake 70, respectively.

FIG. 6 shows a portion of a hydraulic control circuit for controlling the hydraulic clutch 50, the hydraulic brake 70 and the frictional coupling means 102, which is to be connected to the hydraulic control system show in FIG. 4. In FIG. 6, there are shown a passage 159 through which the line pressure is applied to the hydraulic control circuit and a passage 163 through which the governor pressure is applied to the hydraulic control circuit. The essential part of the hydraulic control system for controlling the automatic transmission is omitted in FIG. 6, since the construction thereof is the same as that of the hydraulic control system in FIG. 4.

With a spool 165 of a speed selector valve 164 positioned at position A as illustrated, the line pressure prevailing within the passage 159 is applied to a selector valve 160 through a passage 162 and to a modulator valve 167 through a passage 166. The modulator pressure regulated by the modulator valve 167 is applied to the tope of the spool 170 of an inhibitor valve 169 through a passage 168. The governor pressure is applied to the lower part of the spool 170 of the inhibitor valve 169 through the passage 163. Thus, the spool 170 is operated according to the relationship between the sum of the resilient force of a spring 171 and the governor pressure and the modulator pressure.

Accordingly, when the governor pressure increases in excess of a predetermined level, the spool 170 is moved to the upper position, whereby the line pressure is applied to the cylindrical chamber 55 of the hydraulic clutch 50 of the auxiliary transmission 108 so that the output shaft 1 and the intermediate shaft 2 are coupled directly, whereas when the governor pressure is decreased below a certain level specified in relation with the land area of the spool 170, the spool 170 is moved to the lower position, whereby the line pressure is applied to the cylindrical chamber 73 of the hydraulic brake 70 so that the revolving rate of the intermediate shaft 2 is changed.

With the spool 165 of the speed selector valve 164 positioned at position B, the passage 166 connected to the modulator valve 167 is interrupted, hence the modulator pressure is not generated. Consequently, the spool 170 of the inhibitor valve 169 is moved to the upper position by the governor pressure so that the output shaft 1 and the intermediate shaft 2 are directly coupled continually.

With the spool of the speed selector valve 164 positioned at position A or position B, the line pressure is applied to the selector valve 160 through the passage 162, therefore, the frictional force of engagement of the frictional members of the frictional coupling means 101 can be controlled in the manner described with reference to FIG. 4 through the operation of the selector valve 160 in any running mode. Thus smooth four-wheel drive running of the vehicle is allowed under any road condition through the combination of the auxiliary transmission 108 and the frictional coupling means 101. Spool position C of the speed selector valve 164 provides the two-wheel drive mode, in which the pressurized fluid is not supplied to the frictional coupling means 101.

In accordance with the present invention, a first intermediate output shaft is connected to the output shaft of a power source or the intermediate shaft connected to said output shaft of the power source which transmits a driving force to either the front axle or the rear axle by means of a frictional coupling means.

The first intermediate output shaft and a second intermediate output shaft which transmits a driving force to the other axle are interconnected by means of a power transmitting means. The frictional coupling means comprises a first coupling member fixed to and rotated together with the output shaft of the power source or the intermediate shaft and a second coupling member fixed to and rotated together with the first intermediate output shaft which are adapted to be coupled or uncoupled through the frictional engagement or the disengagement of frictional members. A first piston for controlling the frictional engagement of the frictional members is provided slidably either in the first coupling member or in the second coupling member, and a second piston is slidably fitted in the first piston within the cylinder in which the first piston is received, whereby the first piston is moved to cause the frictional members to engage by the reaction of the movement of the second piston.

Accordingly, in actuating the second piston and frictionally coupling the output shaft of the power source or the intermediate shaft and the first intermediate output shaft for four-wheel drive, the output shaft of the transfer mechanism connected to the front axle and the output shaft of the transfer mechanism connected to the rear axle are driven at the same revolving rate or at a predetermined ratio of revolving rates between those output shafts during the straight running of the vehicle, whereas an excessive torque generated in the driving train when the vehicle runs along a curve is absorbed by the slip between the frictional members, so that the turning of the vehicle is attained smoothly and the traction of the four wheels is ensured. Thus, the riding comfortableness of the vehicle is improved, since torsion of the output shafts for the front and rear axles and the wear of the driving train are prevented.

When the output shafts of the transfer mechanism connected to the front and the rear axles are required to be driven in "locked" state in running on a rough road or in getting away from a dangerous road, the output shafts can be "locked" by increasing the force of frictional engagement of the frictional members through the actuation of the first piston.

Furthermore, in accordance with the present invention, the revolving rate of the intermediate shaft can be changed between low speed revolution and high speed revolution by provision of an auxiliary transmission between the output shaft and the intermediate shaft. Additionally, the combination of the auxiliary transmission and the change of the force of frictional engagement of the frictional members enable the transfer mechanism for four-wheel drive operation of a vehicle to meet the requirements of various running conditions.

Furthermore, since the transfer mechanism in accordance with the invention, as against the conventional transfer mechanism, does not include a differential mechanism, the vehicle equipped with the transfer mechanism of the present invention is free from failing running to run during four-wheel drive running. Still further, the transfer mechanism of the present invention has many features such as simplicity of construction, low manufacturing cost and facility of changing between the two-wheel drive mode and four-wheel drive mode.

It will thus be seen that the objects set forth above, amoung those made apparent from the preceeding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A torque transfer mechanism for a four-wheel drive vehicle, comprising the output shaft of a power source of said vehicle, a first intermediate output shaft capable of being coupled with said output shaft by means of frictional coupling means, said frictional coupling means comprising:

a first coupling member connected to one of said output shaft of the power source and said first intermediate output shaft and provided with frictional members, a second coupling member connected to the other of said output shaft and said first intermediate output shaft, disposed concentrically with said first coupling member, provided with frictional members and forming a first cylinder, a first piston fitted in said first cylinder axially slidably of said second coupling member and adapted to cause the frictional members provided for said first and second coupling members to engage frictionally so that said frist and second coupling members are interconnected when a pressurized fluid is supplied into said cylindrical chamber of said first cylinder, and a second piston fitted axially slidably of said second coupling member in a second cylinder formed in said first piston so as to open into said cylindrical chamber of said first cylinder and adapted to cause said first piston to move for making said frictional members engage when the pressurized fluid is supplied into the cylindrical chamber of said second cylinder.

2. A torque transfer mechanism for a four-wheel drive vehicle as claimed in claim 1, and further comprising a second intermediate output shaft connected to said first intermediate output shaft by means of a power transmitting means.

3. A torque transfer mechanism for a four-wheel drive vehicle as claimed in claim 2, wherein said first intermediate output shaft is disposed concentrically with the output shaft of said power source, said second intermediate output shaft is disposed in parallel with said first intermediate output shaft, and said first intermediate output shaft and said second intermediate output shaft are drivingly interconnected by means of a chain belt or gear wheels.

4. A torque transfer mechanism for a four-wheel drive vehicle as claimed in claim 1 or 2, wherein said power source includes an automatic transmission consisting of a torque converter, a transmission gear and a hydraulic control system, and the pressurized fluid is supplied into the respective cylindrical chambers of said first and second cylinders from said hydraulic control system.

5. A torque transfer mechanism for a four-wheel drive vehicle, comprising the output shaft of a power source of the vehicle, an intermediate shaft disposed coaxially with said output shaft, an auxiliary transmission interposed between said output shaft of the power source and said intermediate shaft and adapted to transmit the rotation of said output shaft to said intermediate shaft at predetermined ratios of revolving rate, a first intermediate output shaft connected to said intermediate shaft through a frictional coupling means, said frictional coupling means comprising:

a first coupling member connected to one of said intermediate shaft and said first intermediate output shaft and provided with frictional members, a second coupling member connected to the other of said intermediate shaft and said first intermediate output shaft, disposed concentrically with said first coupling member, provided with frictional members and forming a first cylinder a first piston fitted in said first cylinder axially slidably of said second coupling member and adapted to cause the frictional members provided for said first and second coupling members to engage frictionally so that said first and second coupling members are interconnected when a pressurized fluid is supplied into the cylindrical chamber of said first cylinder, and a second piston fitted axially slidably of said second coupling member in a second cylinder formed in said first piston so as to open into the cylindrical chamber of said first cylinder and adapted to cause said first piston to move for making said frictional members engage when the pressurized fluid is supplied into the cylindrical chamber of said second cylinder.

6. A torque transfer mechanism for a four-wheel drive vehicle as claimed in claim 5, and further comprising a second intermediate output shaft connected to said first intermediate output shaft through a power transmitting means.

7. A torque transfer mechanism for a four-wheel drive vehicle as claimed in claim 6, wherein said first intermediate output shaft is disposed coaxially with said output shaft of said power source, said second intermediate output shaft is disposed in parallel with said first intermediate output shaft, and said first and second intermediate output shafts are drivingly interconnected by means of a chain belt or gear wheels.

8. A torque transfer mechanism for a four-wheel drive vehicle as claimed in claim 6, wherein said auxiliary transmission comprises a hydraulic clutch, a planetary gear mechanism consisting of a sun gear, planetary pinions, a ring gear and a carrier rotatably supporting the planetary pinions, and a brake adapted to fixedly connect said ring gear and a fixed part of the auxiliary transmission, one of the engaging elements of said hydraulic clutch and the sun gear of said planetary gear mechanism are fixed to the output shaft of said power source, the other one of the engaging elements of said hydraulic clutch is connected to the carrier of said planetary gear mechanism, and the carrier is connected to said intermediate shaft.

9. A torque mechanism for a four-wheel drive vehicle as claimed in claim 8, wherein said power source includes an automatic transmission consisting of a torque converter, a transmission gear and a hydraulic control system, and the pressurized fluid is supplied into the cylinder of said hydraulic cluthc, the cylinder of said hydraulic brake and the cylindrical chambers of said first and second cylinders from said hydraulic control system.

* * * * *